United States Patent [19]

Kobayashi et al.

[11] Patent Number: 4,861,816

[45] Date of Patent: Aug. 29, 1989

[54] POLYVINYL CHLORIDE RESIN COMPOSITION FOR POWDER MOLDING

[75] Inventors: Masanori Kobayashi; Isao Matsuura; Akira Wakatsuki; Yu Shida, all of Osaka, Japan

[73] Assignee: Sumitomo Chemical Company, Osaka, Japan

[21] Appl. No.: 132,887

[22] Filed: Dec. 9, 1987

[30] Foreign Application Priority Data

Dec. 29, 1986 [JP] Japan ................................ 61-311269

[51] Int. Cl.$^4$ ............................................... C08K 5/09
[52] U.S. Cl. ................................. 524/204; 524/396; 524/397; 524/399; 524/436; 524/437; 524/401; 524/567
[58] Field of Search ............... 524/396, 397, 399, 400, 524/436, 437, 401, 204, 567

[56] References Cited

U.S. PATENT DOCUMENTS

| | | | |
|---|---|---|---|
| 4,659,764 | 4/1987 | Isao et al. | 524/436 |
| 4,675,356 | 6/1987 | Miyata | 524/436 |
| 4,729,854 | 3/1988 | Miyata et al. | 524/436 |

Primary Examiner—Veronica P. Hoke
Attorney, Agent, or Firm—Wenderoth, Lind & Ponack

[57] ABSTRACT

A polyvinyl chloride resin composition for powder molding which is excellent in resistance to mold staining and in amine resistance, the improvement wherein the polyvinyl chloride composition contains blended therein 0.1–10 parts by weight of a stabilizer mixture of barium salt of the carboxylic acid and zinc salt of a carboxylic acid, each having a melting point not lower than 250° C., the barium and zinc metallic weight ratio being 1:5 to 5:1, and 0.1–10 parts by weight of a metal perchlorate and/or perchlorate ion type hydrotalcite compound per 100 parts by weight of a polyvinyl chloride resin.

1 Claim, No Drawings

POLYVINYL CHLORIDE RESIN COMPOSITION FOR POWDER MOLDING

In recent years, there is an increasingly stronger demand for such covering materials for automobile interior parts especially, those which are light in weight, superior in feelings of softness and which have embossed or stitched patterns on the surface thereof to produce products which have a high grade appearance.

Hitherto, these covering materials include vacuum-formed products of plasticized sheets composed mainly of polyvinyl chlorides resins and ABS resins, and rotational-molded or slush-molded products of a sol composed mainly of polyvinyl chloride paste resins and plasticizers (hereinafter referred to as sol molded products).

Although the vacuum-formed product meets the object in terms of reduction in weight, it is poor in a feeling of softness, and only those of a stiff touch are obtained. Further, it is difficult to fabricate into products of complicated shape having embossed or stitched patterns giving a feeling of high grade on the surface.

Also, the vacuum-formed product has a drawback in that, because of its large residual strain on forming, cracks are easily formed during long-term use.

On the other hand, although the sol molded product has a feeling of softness, the sol, because of its low gelation temperature, rapidly melts in the mold, and phenomena such as flow mark, lip, stringiness of the sol, etc. occur.

For this reason, the sol molded product has drawbacks that its inside surface lacks smoothness, and the discharge of the sol from the mold takes too long a time; moreover, the thickness of the covering material becomes large.

Further, the sol has also problems in that a great deal of labor is required to clean tanks, pipes, etc. at the time of change of color, and in that the viscosity changes with the lapse of time so that the sol cannot stand long-term storage.

In recent years, a powder molding method is attracting attention to solve these drawbacks and problems.

Generally, the powder molding method includes a fluidized bed coating, electrostatic coating, powder flame spray coating, powder rotational molding, powder slush molding techniques and the like. Particularly, the powder rotational molding and powder slush molding techniques are suitble for producing covering materials for automobile interior parts.

This powder rotational molding or powder slush molding is a method in which, by rotating or shaking an assembled unit of a mold kept at a temperature of 180° C. or higher and a resin powder supply box, or jetting the resin powder into the mold, the resin powder is fusion-adhered to the inner surface of the mold, and the residual unfused powder is recovered automatically or forcibly into the box.

Also, as examples of methods to heat the mold in such powder molding process, there may be mentioned a method of using a gas furnace, a method of circulating a heat medium oil, a method of dipping into a heat medium oil or heated flowing sand and also, high-frequency induction heating methods, etc.

The powdery composition used in such powder molding should be superior in flowability and moldability.

It is well known to produce a powdery composition by dry-blending a polyvinyl chloride resin with a plasticizer, stabilizer, pigment, etc. on a blender or high-speed rotating mixer equipped with a heating jacket.

In order to improve the flowability, it is also well known to add a finely powdered polyvinyl chloride resin and an inorganic filler such as finely powdered calcium carbonate, silica, etc. at the cooling step after completion of the dry-blending (Rubber Digest, Vol. 14, No. 8, pp. 32–40; Polyvinyl Chloride—Its Chemistry and Industry II, pp. 367–370, 1968; and Japanese Patent Publication No. 1575/1962).

Also, there is a great need for a powdery composition for producing covering materials by powder molding, which is superior in a mold staining preventing ability at the time of powder molding (hereinafter referred to as resistance to mold staining) and shows a good resistance to amine staining at the time of attachment of urethane to the covering material (hereinafter referred to as amine resistance).

A more detailed explanation will be given. In powder molding, a powdery composition is fusion-adhered to a mold kept at a high temperature as described above, so that the surface of the mold is gradually stained as the number of molding shots increases.

When staining of the mold proceeds, the hollows of the embossed pattern on the inner surface of the mold become shallow because of the accumulation of stain, and as a result, the covering material undesirably comes to be glossy. Also, when stain on the mold contains tacky substances, it becomes difficult to remove the formed covering material from the mold, and in some cases, hollows are undesirably formed on the surface of the covering material.

In order to avoid the foregoing troubles, it cannot be helped to stop molding temporarily for cleaning the mold, as a result of which the productivity is markedly reduced. Also, extra labor and chemicals (alkali solutions, acid solutions, halogenated hydrocarbon solvents used for cleaning) are required for cleaning. Further, when stain is too heavy to remove it by cleaing, mechanical brushing (brass brushing, brushing with a forced jet of fine glass beads and air) is required. However, when such brushing is applied frequently, there appears the foregoing phenomenon that the hollows of the embossed pattern on the inner surface of the mold become shallow because of accumulation of stain, and also the life of the mold is shortened.

It becomes therefore very important industrially and economically to develop a powdery composition which does not much stain the mold, in other words, is superior in resistance to mold staining.

Also, the composition of the present invention is used to produce automobile interior parts, etc., andin such application, the interior parts are frequently used in combination with urethane, so that it becomes necessary to prevent the interior parts from discoloration by an amine owing to the urethane. Consequently, it has been demanded to develop a polyvinyl chloride resin composition for powder molding excellent in the amine resistance.

The present invention relates to a polyvinyl chloride resin composition for powder molding excellent in resistance to mold staining and in amine resistance, characterized in that there are blended 0.1 to 10 parts by weight of a stabilizer mixture of the barium salt of a carboxylic acid and the zinc salt of a carboxylic acid, each having a melting point not lower than 250° C., the barium and zinc metallic weight ratio being 1:5 to 5:1, and 0.1 to 10 parts by weight of a metal perchlorate and/or perchlorate ion type hydrotalcite compound per 100 parts by weight of a polyvinyl chloride resin.

The characteristic of the present invention is to blend the barium salt of a carboxylic acid and the zinc salt of a carboxylic acid, each having a melting point not lower than 250° C. Hitherto, stabilizers falling unde the category of the metal soap of a carboxylic acid generally having a melting point not higher than 250° C. For example, metal soap type stabilizers such as stearate, palmitate, laurate, caprylate, oleate, linolate, ricinoleate, hydroxystearate, etc. are poor in compatibility with polyvinyl chloride resins when they are used in powder molding wherein no shear is applied, and also they have a lubricating action in themselves, so that a phenomenon of "plate out" easily occurs to give heavy stains to the mold. Further, it is observed with such metal soap type stabilizers that a phenomenon of white powder breaking out on the surface of the molded product, generally called blooming, appears with the lapse of time. These stabilizers, therefore, are ones not suitable for powder molding.

On the other hand, stabilizers falling under the category of the metal soap of fatty acids having an alkyl group having from 5 to 8 carbon atoms such as nonanoate, octanoate, heptanoate, hexanoate, etc., for example the barium salt and zinc salt of the fatty acids have fairly improved resistance to mold staining as compared with the foregoing compounds.

However, as the practical use of powder molding develops, the required level of the resistance to mold staining has risen so markedly that satisfaction is getting not to always be obtained with these compounds.

That is, it has been desired to reduce the number of washings of mold or keep the generation of gloss on covering materials at the time of continuous molding at a lower level.

With the foregoing stabilizers falling under the category of the metal soap of fatty acids having an alkyl group having from 5 to 8 carbon atoms, it has been known that 100-shot continuous molding is a limit for the stabilizers, seeing the degree of staining of mold and the tendency of generation of gloss on the molded product.

In view of the situation like this, the present inventors have made an extensive study on a stabilizer which is excellent in the resistance to mold staining and also low in the tendency to generate gloss on the covering material. As a result, the present inventors accomplished the object by using a metal soap type stabilizer, which is a metal salt of a carboxylic acid, having a melting point not lower than 250° C.

A more detailed explanation will be given. In powder molding, particularly powder rotational molding or powder slush molding with a powdery polyvinyl chloride resin composition, the composition is fusion-adhered to the mold kept at a temperature in a range of from 180° to 250° C. When the temperature of the mold is lower than 180° C., fusion of the powder becomes insufficient and hollows and pin holes are formed on the surface of the covering material, so that such the temperature is not preferred. The temperature of the mold higher than 250° C. is not also preferred because the covering material undergoes remarkable discoloration and thermal decomposition.

However, for example stabilizers falling under the category of the metal soap of fatty acids having an alkyl group having from 5 to 8 carbon atoms are a liquid and well compatible with a plasticizer. Consequently, when the powdery composition containing a plasticizer is fusion-adhered to a mold of such a high temperature, the plasticizer bleeds out toward the surface of the mold.

It was found that a trace amount of the liquid stabilizer incorporated bleeds out together with the bleeding plasticizer. Upon further continuous molding, the stabilizer which has bled accumulates on the mold to undergo a change in quality and decomposition.

When such staining of the mold occurs, the hollows of the embossed pattern on the inner surface of the mold become shallow, and the surface of the covering material becomes smooth to promote the generation of gloss.

Further, there occurs an undesirable phenomenon that the stain on the mold is transferred to the covering material to stain the material.

Contrary to this, it was found that the metal soap type stabilizer of the present invention, which is a metal salt of a carboxylic acid, having a melting point not lower than 250° C. is insoluble in a plasticizer and, if molded at a mold temperature of from 180° to 250° C., does not bleed out together with the bleeding plasticizer, as a result of which the accumulation of stain on the mold is very little and generation of gloss on the covering material is also very little.

As to the metal soap type stabilizer of the present invention, which is a metal salt of a carboxylic acid, having a melting point not lower than 250° C., the following examples may be given by means of an electroheating block melting point measureing instrument (produced by Yanagimoto Seisakusho Co., Ltd.), but said stabilizer is not limited to these examples. Barium salt type stabilizer includes: Barium oxalate, barium malonate, barium maleate, barium tartrate, barium benzoate, barium p-tert-butylbenzoate, barium succinate, barium glutarate, barium adipate, barium pimelate, barium suberate, barium azelate, barium sebacate, barium paratartrate, barium malate, barium acrylate, barium methacrylate, barium phthalate, barium isophthalate, barium terephthalate, barium salicylate, barium anthranilate, barium cinnamate, barium mandelate, barium α-naphthoate, barium β-naphthoate, etc. Zinc salt type stabilizer includes: Zinc oxalate, zinc malonate, zinc maleate, zinc tartrate, zinc benzoate, zinc p-tert-butylbenzoate, zinc succinate, zinc glutarate, zinc adipate, zinc pimelate, zinc suberate, zinc azelate, zinc sebacate, zinc paratartrate, zinc malate, zinc cinnamate, zinc mandelate, zinc α-naphthoate, zinc β-naphthoate, etc.

These barium salt type stabilizer and zinc salt type one are used in combination, and a proper barium to zinc metallic weight ratio is in a range of from 1:5 to 5:1, particularly preferably from 1:3 to 5:1.

When the amount of zinc is larger than that expressed by a barium to zinc metallic weight ratio of 1:5, there are caused such dangers that the dehydrochlorinating action of zinc becomes strong to lower the thermal resistance of the stabilizer at the time of molding, and black spots and foams are produced on the formed covering material. Such excessive amount of zinc is not therefore preferred. On the other hand, when the amount of barium is larger than that expressed by a barium to zinc meallic weight ratio of 5:1, a tendency for the covering material to be colored, particularly red, at the initial stage of molding becomes remarkable. As a result, the color of the formed covering material deviates from the desired one, which is not preferred in terms of color matching.

The amount of the foregoing barium-zinc salt type stabilizer mixture used is preferably in a range of from 0.1 to 10 parts, more preferably from 0.5 to 5 parts by weight based on 100 parts by weight of a polyvinyl chloride resin. When said amount is less than 0.1 part by weight, the thermal resistance of the stabilizer at the time of molding becomes unpreferably poor, while when said amount is larger than 10 parts by weight, the strength of the covering material becomes extremely too low to put to practical use, and the cost increases to become economically disadvantageous.

The second characteristic of the composition of the present invention is that said composition is excellent in amine resistance. This characteristic is particularly useful when urethane is injected into a molded product obtained from the composition of the present invention and then foamed. In such urethane foaming in place, an amine compound is used as a catalyst, which includes ethylenediamine, triethylenediamine, triethylenetetramine, triethanolamine, etc. which may be used alone or in combination, and their addition products with alkylene oxide such as ethylene oxide, propylene oxide, butylene oxide, epichlorohydrin, styrene oxide, etc. However, these amine compounds, upon contact with the polyvinyl chloride covering material, cause a very rapid discoloration of the material particularly in the presence of heat and light, and promote the deterioration and change in quality of the polyvinyl chloride resin.

Consequently, it is important to develop a polyvinyl chloride resin powder composition for covering materials having resistance to such amine compounds, and this is the second object of the present invention.

On the assumption that, in powder rotational molding and powder slush molding, it is industrially and economically important to make excellent resistance to mold staining and excellent amine resistance compatible with each other, and that a lack of any one of these two properties makes it nonsense to provide the covering material by powder molding, the present inventors have extensively studied to develop a powdery polyvinyl chloride resin composition having excellent amine resistance and accomplished the object of the present invention by combining the foregoing barium salt type and zinc salt type stabilizers, each of which is a metal salt of a carboxylic acid and has a melting point not lower than 250° C., with a metal perchlorate and/or perchlorate ion type hydrotalcite compound.

In the course of the conventional development of powdery compositions excellent in the amine resistance, there is a thought that a color changed by the action of amine is made a harmless color by the chelation of a zinc-containing stabilizer and an amine which inhibits the dehydrochlorinating action of the amine or a complementary relationship which applies between the color of the chelate compound and a color peculiar to a complex compound produced by the reaction of a polyvinyl chloride resin with the amine.

Previously, the present inventors have found that a magnesium compound has a discoloration preventing ability in the thermal resistance and light fastness tests on the urethane-attached covering material (Japanese Patent Application No. 16594/1984). Because the covering material, however, has come to be produced in smaller thickness by powder molding, a demand for amine resistance has also become further stronger.

That is, the same discoloration level as required for the conventional covering material of 1 mm in thickness produced by powder molding is now also required for covering materials of from 0.5 to 0.8 mm in thickness. Consequently, disadvantages have occurred by using the magnesium-containing stabilizer only as before.

The present inventors accomplished the object of the present invention based on a novel idea, i.e. by using a metal perchlorate and/or perchlorate ion type hydrotalcite compound in relation to the prevention of discoloration caused by amine compounds, particularly tertiary amine compounds.

The metal perchlorate used in the present invention includes barium perchlorate, magnesium perchlorate, aluminium perchlorate, sodium perchlorate, etc.

The perchlorate ion type hydrotalcite compound used in the present invention is a compound produced by contacting a hydrotalcite compound represented by the formula (I), $$Mg_{1-x}Al_x(OH)_2 \cdot (CO_3)_{x/2} \cdot mH_2O \qquad (I)$$

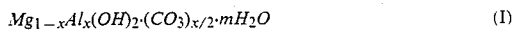

wherein m represents a positive number and x is a number satisfying the equation, $0 < x \leq 0.5$, with an aqueous perchloric acid solution to replace $(CO_3)$ in the formula (I) with $(ClO_4)_2{}^{2-}$, and it has the following formula (II), $$Mg_{1-x}Al_x(OH)_2 \cdot (ClO_4)_2 \cdot mH_2O \qquad (II)$$

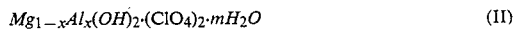

wherein x and m are as defined above.

The hydrotalcite compound is excellent in a halogen-catching ability, but is ability is so large that, in severe conditions, it promotes dehydrochlorination from, for example, polyvinyl chloride resins, as a result of which coloration owing to the formation of polyenes is markedly promoted. Also, the amine resistance of the urethane-attached polyvinyl chloride sheet is insufficient.

The present inventors found that the perchlorate and perchlorate ion type hydrotalcite compound give excellent amine resistance particularly to the urethane-attached polyvinyl chloride sheet. What mechanism this effect is based on is not clear, but it is considered to be based on the two actions, one being a action to lighten coloration owing to polyenes produced by the dehydrochlorination of a polyvinyl chloride resin, and the other being an action, which results from the formation of a complex of the perchlorate ion with the amine, to lighten the dehydrochlorination of a polyvinyl chloride resin.

The amount of the perchlorate and/or perchlorate ion type hydrotalcite compound used in the present invention is preferably from 0.1 to 10 parts, more preferably from 0.5 to 5 parts by weight based on 100 parts by weight of the polyvinyl chloride resin.

When said amount is less than 0.1 part by weight, the amine resistance is poor, while when it is larger than 10 parts by weight, the sheet strength of the formed covering material lowers, and the cost becomes high, being economically disadvantageous.

Thus, the present invention could solve the two important problems at the same time, i.e. improvement in the resistance to mold staining at the time of powder molding and amine resistance of the urethane-attached polyvinyl chloride sheet, by combining the foregoing barium-zinc salt type stabilizer with the perchlorate and/or perchlorate ion type hydrotalcite compound. Any of these stabilizer and compounds may be added alone, but preferably, it is added in a mixed dispersion in a plasticizer.

Also, to these stabilizer and mixed dispersion may be added a stabilizer such as calcium oleate, magnesium oxide, magnesium hydroxide, hydrotalcite compounds, zinc oxide, barium oxide, calcium oxide, barium phosphate, etc. Further, there may be used phenolic antioxidants, thioether antioxidants, hindered amine compounds, phosphite compounds, diketo compunds, ultraviolet absorbers (e.g. salicylate compounds, benzophenone compounds, benzotriazole compounds), epoxidized soybean oil, epoxidized compounds synthesized from bisphenol A and epichlorohydrin, etc.

The polyvinyl chloride resin used in the present invention includes those which are produced by suspension polymerization, bulk polymerization or emulsion polymerization, and for example there are given vinyl chloride polymers, copolymers of vinyl chloride with a compound copolymerizable therewith such as ethylene, propylene, vinyl acetate, etc., graft copolymers of an ethylene/vinyl acetate copolymer with vinyl chloride, and mixtures of two or more of them. However, the polyvinyl chloride resin of the present invention is not limited to these resins.

The plasticizer used in the present invention includes phthalic esters such as diisodecyl phthalate, diisoundecyl phthalate, di($C_9$–$C_{11}$)alkyl phthalates, etc., and trimetllitic esters such as trioctyl trimellitate, tri-2-ethylhexyl trimellitate, tridecyl trimellitate, tri($C_7$–$C_9$ or $C_7$–$C_{11}$)alkyl trimellitates, etc.

Also, it is possible to use a small amount of epoxy plasticizers, polyester plasticizers, etc. The plasticizer used in the present invention, however, is not limited to these ones.

To the polyvinyl chloride resin composition of the present invention may be added a filler and various auxiliaries in addition to the plasticizer, stabilizer and pigment, as need arises.

For the polyol, catalyst, foaming agent, polyisocyanate, etc. used in the urethane foaming in place of the present invention, the well-known ones commonly used in the production of polyurethane foams may be used.

In powder molding, the composition of the present invention can be used in continuous molding of more than 300 shots. Besides, the composition is superior to the conventional ones in that generation of gloss on the surface of the resulting molded product is suppressed to a very low level.

Also, when the molded product of said composition is formed, together with a polyurethane foam, into a laminated product, the amine resistance of the composition is very good. This amine resistance, in cooperation with the excellent resistance to mold staining described above, enables the composition of the present invention to provide very wide applications in the form of automobile interior parts, industrial parts, etc.

EXAMPLES 1 to 18 AND COMPARATIVE EXAMPLES 1 TO 5

Examples of the present invention will be shown below, but the present invention is not limited to these examples.

(1) Preparation of a composition for powder molding

To a 20-liter super-mixer was charged 2 kg of a straight polyvinyl chloride resin having an average degree of polymerization of 700 produced by the usual suspension polymerization (Sumilit ® SX-7GL; produced by Sumitomo Chemical Co., Ltd.). The resin was stirred at a definite rotation speed, and at the point when the resin temperature reached 80° C., dry-blended with addition of a plasticizer, stabilizer previously dispersed in the plasticizer, pigment and epoxidized soybean oil. When the dry-blend temperature reached 122° C., heating steam was shut off, and after completion of dry-blending, the dry blend was cooled to 50° C. or lower by water cooling. Thereafter, 200 g of a finely powdered polyvinyl chloride resin (produced by Sumitomo Chemical Co., Ltd.) was uniformly dispersed in the resulting dry blend to obtain a powdery composition of good flowability.

In producing the powdery composition of the present invention, the additives were blended in a blending ratio as shown in Table 1 with the total of the straight polyvinyl chloride resin and finely powdered polyvinyl chloride resin as 100 parts by weight.

The amount of the stabilizer added is shown in Table 2 for Examples 1 to 18, and in Table 3 for Comparative examples 1 to 5.

TABLE 1

| Composition of powdery composition | | |
| --- | --- | --- |
| Straight polyvinyl chloride resin | 90 Parts by weight | Sumilit ® SX-7GL (produced by Sumitomo Chemical Co., Ltd.) |
| Finely powdered polyvinyl chloride resin | 10 Parts by weight | Sumilit ® PXQL (produced by Sumitomo Chemical Chemical Co., Ltd.) |
| Plasticizer: trioctyl trimellitate | 60 Parts by weight | No. 8 (produced by Kao Co., Ltd.) |
| Epoxidized soybean oil | 4 Parts by weight | Q-130P (produced by Adeka-argus Co., Ltd.) |
| Stabilizer | Suitable amount | Shown in Tables 2 and 3. |
| Pigment (gray) | 4 Parts by weight | (Produced by Sumika Color Co., Ltd.) |

(2) Evaluation of resistance to mold staining

The resistance to mold staining was judged based on the degree of yellowing on mold after molding and the surface gloss (reflectance at 60°) of the formed sheet. An embossed nickel mold of 100 mm × 100 mm × 3 mm (thick) in size was heated on an electroheating hot plate. When the temperature of the mold reached 220° C., the mold was taken out and 100 g of the powdery composition was sprinkled over the mold and fusion-adhered thereto for 10 seconds. After removing the unfused powder, the nickel mold was again placed on the hot plate and heated for 30 seconds to complete fusion. After cooling with ice, the formed sheet was peeled off the mold, and stain on the mold was observed. This procedure was repeated 300 times. The surface glass (reflectance at 60°) of the formed sheet was judged macroscopically and measured by means of a glossmeter.

TABLE 2

Stabilizer system used in Examples

| Example No. | Ba/Zn salt type stabilizer — Stabilizer system | Amount added (part by weight) | Ba/Zn weight ratio | Perchlorate compound (part by weight) | Other additives (part by weight) |
|---|---|---|---|---|---|
| 1 | Barium oxalate | 0.7 | 1.8/1.0 | 1.0 | |
|   | Zinc oxalate | 0.6 | | | |
| 2 | Barium malonate | 0.7 | 1.7/1.0 | 1.0 | |
|   | Zinc malonate | 0.6 | | | |
| 3 | Barium maleate | 0.8 | 1.7/1.0 | 1.0 | |
|   | Zinc maleate | 0.7 | | | |
| 4 | Barium tartrate | 0.9 | 1.8/1.0 | 1.0 | |
|   | Zinc tartrate | 0.8 | | | |
| 5 | Barium benzoate | 1.1 | 1.7/1.0 | 1.0 | |
|   | Zinc benzoate | 1.1 | | | |
| 6 | Barium p-tert-butylbenzoate | 1.5 | 1.8/1.0 | 1.0 | |
|   | Zinc-p-tert-butylbenzoate | 1.5 | | | |
| 7 | Barium benzoate | 1.1 | 1.6/1.0 | 1.0 | |
|   | Zinc maleate | 0.7 | | | |
| 8 | Barium maleate | 0.8 | 1.9/1.0 | 1.0 | |
|   | Zinc benzoate | 1.1 | | | |
| 9 | Barium maleate | 0.8 | 1.9/1.0 | 0.5 | |
|   | Zinc benzoate | 1.1 | | | |
| 10 | Barium maleate | 0.8 | 1.9/1.0 | 2.0 | |
|   | Zinc benzoate | 1.1 | | | |
| 11 | Barium maleate | 0.8 | 1.9/1.0 | 1.0 | Tris.nonylphenyl phosphite, 0.2 |
|   | Zinc benzoate | 1.1 | | | |
| 12 | Barium maleate | 1.0 | 1.7/1.0 | 1.0 | Tris.nonylphenyl phosphite, 0.2 Magnesium hydroxide, 0.2 |
|   | Zinc benzoate | 1.5 | | | |
| 13 | Barium maleate | 0.8 | 1.9/1.0 | Barium perchlorate, 1.0 | |
|   | Zinc benzoate | 1.1 | | | |
| 14 | Barium maleate | 0.8 | 1.9/1.0 | Barium perchlorate, 1.0 | |
|   | Zinc benzoate | 1.1 | | | |
| 15 | Barium maleate | 0.8 | 1.9/1.0 | Magnesium perchlorate, 0.5 | |
|   | Zinc benzoate | 1.1 | | Aluminum perchlorate, 0.5 | |
| 16 | Barium maleate | 0.8 | 1.9/1.0 | Magnesium perchlorate, 0.5 | |
|   | Zinc benzoate | 1.1 | | Sodium perchlorate, 0.5 | |
| 17 | Barium maleate | 0.8 | 1.9/1.0 | Perchlorate ion type hydrotalcite compound, 0.5 | |
|   | Zinc benzoate | 1.1 | | Magnesium perchlorate, 0.5 | |
| 18 | Barium maleate | 0.8 | 1.9/1.0 | Perchlorate ion type hydrotalcite compound, 0.5 | |
|   | Zinc benzoate | 1.1 | | Sodium perchlorate, 0.5 | |

Note:
The perchlorate compound used in Examples 1 to 12 is a perchlorate ion type hydrotalcite compound.

TABLE 3

Stabilizer system used in Comparative examples

| Comparative example No. | Ba/Zn salt type stabilizer — Stabilizer system | Amount added (part by weight) | Ba/Zn weight ratio | Perchlorate compound (part by weight) | Other additives (part by weight) |
|---|---|---|---|---|---|
| 1 | Barium octoate | 1.4 | 1.8/1.0 | — | |
|   | Zinc octoate | 1.4 | | | |
| 2 | Barium octoate | 1.4 | 1.8/1.0 | 1.0 | |
|   | Zinc octoate | 1.4 | | | |
| 3 | Barium octoate | 1.4 | 1.8/1.0 | 1.0 | Tris.nonylphenyl phospite, 0.2 |
|   | Zinc octoate | 1.4 | | | |
| 4 | Barium benzoate | 1.1 | 1.7/1.0 | — | |
|   | Zinc benzoate | 1.1 | | | |
| 5 | Barium maleate | 0.8 | 1.9/1.0 | — | |
|   | Zinc benzoate | 1.1 | | | |

Note:
The perchlorate compound used in Comparative examples 2 and 3 is a perchlorate ion type hydrotalcite compound.

(3) Evaluation of amine resistance

The amine resistance test was carried out as follows: A sheet of 300 mm×300 mm×0.8 mm (thick) in size produced by powder molding was placed, with its embossed surface faced downwards, on an aluminum support frame of 300 mm×300 mm×10 mm (thick) in size.

one test piece could be taken out at every 100 hours. Thus, a 400-hour discoloration test was conducted.

(4) Result of evaluation

The results of Examples 1 to 18 are shown in Tables 4 and 6, and those of Comparative examples 1 to 5 are shown in Tables 5 and 7.

TABLE 4

Evaluation of resistance to mold staining and generation of surface gloss

| Number of continuous shots | Evaluation of resistance to mold staining (Mold: embossed nickel plate) | | | | | | Evaluation of generation of surface gloss | | | | | | | | | | | |
|---|---|---|---|---|---|---|---|---|---|---|---|---|---|---|---|---|---|---|
| | | | | | | | Macroscopic judgement | | | | | | Glossmeter (%) | | | | | |
| | 1 | 10 | 50 | 100 | 200 | 300 | 1 | 10 | 50 | 100 | 200 | 300 | 1 | 10 | 50 | 100 | 200 | 300 |
| Example | | | | | | | | | | | | | | | | | | |
| 1 | | | | | | ~Δ | | | | | | | 1.5 | 1.5 | 1.6 | 1.6 | 1.8 | 2.0 |
| 2 | | | | | | ~Δ | | | | | | | 1.5 | 1.5 | 1.5 | 1.6 | 1.8 | 1.9 |
| 3 | | | | | | ~Δ | | | | | | | 1.5 | 1.5 | 1.5 | 1.6 | 1.8 | 2.0 |
| 4 | | | | | | ~Δ | | | | | | | 1.5 | 1.5 | 1.5 | 1.6 | 1.8 | 1.9 |
| 5 | | | | | | ~Δ | | | | | | | 1.5 | 1.5 | 1.5 | 1.6 | 1.7 | 1.8 |
| 6 | | | | | | ~Δ | | | | | | | 1.5 | 1.5 | 1.5 | 1.6 | 1.8 | 1.8 |
| 7 | | | | | | ~Δ | | | | | | | 1.5 | 1.5 | 1.5 | 1.6 | 1.8 | 1.9 |
| 8 | | | | | | ~Δ | | | | | | | 1.5 | 1.5 | 1.5 | 1.6 | 1.8 | 1.9 |
| 9 | | | | | | ~Δ | | | | | | | 1.5 | 1.5 | 1.5 | 1.6 | 1.8 | 1.9 |
| 10 | | | | | | ~Δ | | | | | | | 1.5 | 1.5 | 1.5 | 1.6 | 1.8 | 1.9 |
| 11 | | | | | | ~Δ | | | | | | | 1.5 | 1.5 | 1.5 | 1.6 | 1.7 | 1.8 |
| 12 | | | | | | ~Δ | | | | | | | 1.5 | 1.5 | 1.5 | 1.6 | 1.7 | 1.8 |
| 13 | | | | | | ~Δ | | | | | | | 1.5 | 1.5 | 1.5 | 1.6 | 1.8 | 1.9 |
| 14 | | | | | | ~Δ | | | | | | | 1.5 | 1.5 | 1.5 | 1.6 | 1.7 | 1.8 |
| 15 | | | | | | ~Δ | | | | | | | 1.5 | 1.5 | 1.5 | 1.6 | 1.8 | 1.9 |
| 16 | | | | | | ~Δ | | | | | | | 1.5 | 1.5 | 1.5 | 1.6 | 1.7 | 1.8 |
| 17 | | | | | | ~Δ | | | | | | | 1.5 | 1.5 | 1.5 | 1.6 | 1.8 | 1.9 |
| 18 | | | | | | ~Δ | | | | | | | 1.5 | 1.5 | 1.5 | 1.6 | 1.7 | 1.8 |

Note:
Standard of evaluation
(1) Resistance to mold staining and macroscopic judgement of surface gloss
  Little stain
Δ Slight stain
X Much stain
(2) Glossmeter
A smaller value is better with less gloss.

TABLE 5

Evaluation of resistance to mold staining and generation of surface gloss

| Number of continuous shots | Evaluation of resistance to mold staining (Mold: embossed nickel plate) | | | | | | Evaluation of generation of surface gloss | | | | | | | | | | | |
|---|---|---|---|---|---|---|---|---|---|---|---|---|---|---|---|---|---|---|
| | | | | | | | Macroscopic judgement | | | | | | Glossmeter (%) | | | | | |
| | 1 | 10 | 50 | 100 | 200 | 300 | 1 | 10 | 50 | 100 | 200 | 300 | 1 | 10 | 50 | 100 | 200 | 300 |
| Comparative example | | | | | | | | | | | | | | | | | | |
| 1 | | | | ~Δ | Δ | X | | | | ~Δ | ~Δ | Δ | 1.5 | 1.6 | 1.7 | 2.1 | 2.5 | 3.6 |
| 2 | | | | ~Δ | Δ | X | | | | ~Δ | ~Δ | Δ | 1.5 | 1.6 | 1.7 | 2.2 | 2.4 | 3.4 |
| 3 | | | | ~Δ | Δ | X | | | | ~Δ | ~Δ | Δ | 1.5 | 1.6 | 1.7 | 2.0 | 2.3 | 3.0 |
| 4 | | | | | | ~Δ | | | | | | | 1.5 | 1.6 | 1.7 | 1.8 | 1.9 | 2.0 |
| 5 | | | | | | ~Δ | | | | | | | 1.5 | 1.5 | 1.6 | 1.7 | 1.8 | 1.9 |

Thereafter, 153 g of a total weight of a previously prepared polyol mixture and Polymeric MD having an NCO content of 30.5% in a former to latter weight ratio of 100 parts to 150 parts, said polyol mixture being prepared by mixing water, triethanolamine, triethylenediamine and polyol composed mainly of glycerin/propylene oxide adduct and glycerin/ethylene oxide adduct, was mixed on a high-speed mixer for 10 seconds, and the mixture was injected into the aluminum support frame, and then by clamping, a urethane foam was adhered to the back surface of the sheet.

This urethane-attached sheet was cut into test pieces of 70 mm×150 mm in size, and a group of four test pieces was placed in each of a Geer oven type heating furnace wherein the temperature of the atmosphere was 110° C. and a Sunshine weather-O-meter wherein the the temperature of the black panel was 83° C., so that

TABLE 6

Evaluation of amine resistance

| Time elapsed (hour) | Thermal resistance (Geer oven, 110° C.) | | | | Light fastness (Sunshine weather-O-meter, 83° C.) | | | |
|---|---|---|---|---|---|---|---|---|
| | 100 | 200 | 300 | 400 | 100 | 200 | 300 | 400 |
| Example 1 | 5 | 5 | 5-4 | 4 | 5 | 5 | 5-4 | 5-4 |
| Example 2 | 5 | 5 | 5-4 | 4 | 5 | 5 | 5-4 | 5-4 |
| Example 3 | 5 | 5 | 5-4 | 5-4 | 5 | 5 | 5-4 | 5-4 |
| Example 4 | 5 | 5 | 5-4 | 4 | 5 | 5 | 5-4 | 5-4 |
| Example 5 | 5 | 5 | 5-4 | 5-4 | 5 | 5 | 5-4 | 5-4 |
| Example 6 | 5 | 5 | 5-4 | 5-4 | 5 | 5 | 5-4 | 5-4 |
| Example 7 | 5 | 5 | 5-4 | 5-4 | 5 | 5 | 5-4 | 5-4 |
| Example 8 | 5 | 5 | 5-4 | 5-4 | 5 | 5 | 5-4 | 5-4 |
| Example 9 | 5 | 5 | 5-4 | 4 | 5 | 5 | 5-4 | 5-4 |
| Example 10 | 5 | 5 | 5 | 5-4 | 5 | 5 | 5-4 | 5-4 |
| Example 11 | 5 | 5-4 | 4 | 5 | 5 | 5-4 | 5-4 | |
| Example 12 | 5 | 5 | 5 | 5-4 | 5 | 5 | 5-4 | 5-4 |
| Example 13 | 5 | 5-4 | 5-4 | 4 | 5 | 5-4 | 5-4 | 4 |

TABLE 6-continued

| | Evaluation of amine resistance | | | | | | | |
|---|---|---|---|---|---|---|---|---|
| Time elapsed (hour) | Thermal resistance (Geer oven, 110° C.) | | | | Light fastness (Sunshine weather-O-meter, 83° C.) | | | |
| | 100 | 200 | 300 | 400 | 100 | 200 | 300 | 400 |
| Example 14 | 5 | 5-4 | 5-4 | 4 | 5 | 5-4 | 5-4 | 4 |
| Example 15 | 5 | 5-4 | 5-4 | 4 | 5 | 5-4 | 5-4 | 4 |
| Example 16 | 5 | 5-4 | 5-4 | 4 | 5 | 5-4 | 5-4 | 4 |
| Example 17 | 5 | 5-4 | 5-4 | 4 | 5 | 5-4 | 5-4 | 4 |
| Example 18 | 5 | 5-4 | 5-4 | 4 | 5 | 5-4 | 5-4 | 4 |

Standard of evaluation: Staining or change in color based on the gray scales.
Rating:
5 No change
4 Slight but quiet change
3 Slight but clearly observable change
2 Slightly remarkable change
1 Fairly remarkable change

TABLE 7

| | Evaluation of amine resistance | | | | | | | |
|---|---|---|---|---|---|---|---|---|
| Time elapsed (hour) | Thermal resistance (Geer oven, 110° C.) | | | | Light fastness (Sunshine weather-O-meter 83° C.) | | | |
| | 100 | 200 | 300 | 400 | 100 | 200 | 300 | 400 |
| Comparative example | | | | | | | | |
| 1 | 5 | 4 | 4-3 | 3 | 5 | 5-4 | 4 | 4-3 |
| 2 | 5 | 5-4 | 5-4 | 4 | 5 | 5 | 5-4 | 5-4 |
| 3 | 5 | 5-4 | 5-4 | 5-4 | 5 | 5 | 5-4 | 5-4 |
| 4 | 5 | 4 | 4-3 | 3 | 5 | 5-4 | 4 | 4-3 |
| 5 | 5 | 4 | 4-3 | 3 | 5 | 5-4 | 4 | 4-3 |

What we claim is:

1. A polyvinyl chloride resin composition for powder molding, excellent in resistance to mold staining and in amine resistance, characterized in that said polyvinyl chemical resin has blended therein 0.1-10 parts by weight of a stabilizer mixture of a barium salt of a carboxylic acid and a zinc salt of a carboxylic acid, each having a melting point not lower than 250° C., the barium and zinc metallic weight ratio being 1:5 to 5:1, and 0.1-10 parts by weight of a perchlorate ion type hydrotalcite compound per 100 parts by weight of polyvinylchloride resin, wherein the perchlorate ion type hydrotalcite compound has the formula:

$$Mg_{1-x}Al_x(OH)_2 \cdot (ClO_4)_2 \cdot mH_2O$$

wherein x is a number satisfying the equation $0 < x \leq 0.5$ and m represents a positive number of 5 or less, wherein
said barium salt of a carboxylic acid is selected from the group consisting of barium oxalate, barium malonate, barium maleate, barium tartrate, barium benzoate, barium p-tert-butyl benzoate, barium succinate, barium glutarate, barium adipate, barium pimelate, barium suberate, barium azelate, barium sebacate, barium paratartrate, barium malate, barium phthalate, barium isophthalate, barium terephthalate, barium salicylate, barium anthranilate and barium mandelate, and
said zinc salt of a carboxylic acid is selected from the group consisting of zinc oxalate, zinc malonate, zinc maleate, zinc tartrate, zinc benzoate, zinc p-tert-butyl benzoate, zinc succinate, zinc glutarate, zind adipate, zinc pimelate, zinc suberate, zinc azelate, zinc sebacate, zinc paratartrate and zinc malate.

* * * * *

UNITED STATES PATENT AND TRADEMARK OFFICE
CERTIFICATE OF CORRECTION

PATENT NO. : 4,861,816
DATED : August 29, 1989
INVENTOR(S) : Masanori KOBAYASHI et al.

It is certified that error appears in the above-indentified patent and that said Letters Patent is hereby corrected as shown below:

Column 14:
    Claim 1, line 4, change "chemical" to --chloride--.

Signed and Sealed this

Thirteenth Day of August, 1996

Attest:

BRUCE LEHMAN

*Attesting Officer*     *Commissioner of Patents and Trademarks*